United States Patent Office 2,776,996
Patented Jan. 8, 1957

2,776,996

MANUFACTURE OF BETA-METHYLMERCAPTO-PROPIONALDEHYDE

Madison Hunt, Claymont, Del., and Richard R. Merner, Avondale, Pa., assignors to E. I. du Pont de Nemours and Company, Wilmington, Del., a corporation of Delaware No Drawing. Application December 22, 1955, Serial No. 554,619

8 Claims. (Cl. 260—601)

This invention deals with an improved process for manufacturing beta-methylmercapto-propionaldehyde. It is an object of this invention to provide an economical and efficient process for manufacturing the aforementioned intermediate from acrolein and methyl mercaptan in good yield. Various other objects and achievements of this invention will appear as the description proceeds.

Beta-methylmercapto-propionaldehyde is an intermediate in the manufacture of methionine, which in turn is an important vitamin or food supplement for animals and poultry. Pharmaceutical grades thereof for human consumption are also being manufactured.

U. S. Patent No. 2,485,236 describes a process of manufacturing beta-methylmercapto-propionaldehyde by reacting acrolein and methyl mercaptan in the presence of pyridine or other non-acidic catalyst. The process involves the use of an excess of the mercaptan, and the need of keeping the reaction mass cool (0° to 20° C.) is stressed. A yield of 98% is claimed, but the essentially 100% excess of methyl mercaptan must be removed and recovered, and the reaction requires refrigeration, as by the aid of brine.

In U. S. Patent No. 2,676,190, Bernard and Merner offer an improvement upon said process, which depends on a regulated rate of addition of acrolein into a mixture of methyl mercaptan and pyridine. Essentially stoichiometric proportions of the two principal reactants are employed, and very good yields on a commercial scale are said to be obtained.

The procedure of Bernard and Merner does indeed constitute a very important improvement on the practice preceding it. It has been found, however, that despite all precautions to adhere to a regulated routine as prescribed in said patent, the yield on a commercial scale occasionally drops to a low value. Moreover, such low yields are generally accompanied by a low grade of purity in the desired product. Both these annoying factors are presumably caused by the strong tendency of the reaction mass to undergo aldolization and polymerization during the reaction.

We have now found that control of the process can be achieved to a much more satisfactory degree, producing consistently high yields and products of high purity, on a commercial scale, if a mild or strong acid is added to the reaction mass in quantity insufficient to neutralize the entire basic catalyst during the early stages of the reaction. By mild or strong acid, we mean one whose dissociation constant in aqueous medium (water, or aqueous alcohol) is not less than $1 \times 10^{-6}$. Presumably, such acid forms a salt with part of the nitrogenous base catalyst; according to our invention, however, care is taken to insure an excess of the base until at least 10 mol percent of the acrolein has reacted. During the last stages of the reaction, on the other hand, for instance after ⅔ of the acrolein has been consumed, the quantity of acid may be much larger, and may reach as high as 10 equivalents of acid per equivalent of base.

The acid may be inorganic or organic. Suitable inorganic acids include sulfuric, ethyl hydrogen sulfate, phosphoric, phosphorus, hydrofluoric, hydrochloric and hydrobromic acid. Appropriate organic acids are the aliphatic, aromatic, aliphatic-aromatic, and heterocyclic mono- and poly-carboxylic acids. Representative carboxy-acids are formic, acetic and their homologs (e. g. propionic, octanoic), acrylic, trichloroacetic, trifluoroacetic, oxalic, succinic, adipic, phenylacetic, benzoic, cinnamic, phthalic, furoic, thiophene-carboxylic acid and the like. Organic sulfo-acids such as methanesulfonic, p-toluene sulfonic acid are also suitable. Finally, one may add substances which produce a mild or strong acid by reacting with methyl mercaptan in the reaction mass, for instance boron trifluoride. The organic acids, particularly the carboxy-acids, are the preferred acids, and for reasons of economy acetic acid is the preferred acid.

The acid may be added to the acrolein and then fed together therewith into the methyl mercaptan-nitrogenous base mixture. Or the acid may be entered first into the mercaptan-base mixture, into which the acrolein is then fed. Or the acrolein and methyl mercaptan may first be mixed together, the acid added, and then the nitrogenous base may be fed in. Or again, the methyl mercaptan may be fed into a mixture of the acrolein, acid and base.

The total quantity of acid added may vary from about 0.05 to about 4 or even 10 equivalents per equivalent of the nitrogenous base employed. As already indicated, an excess of acid may be present during the later stages of the reaction, but such excess is not essential, and the quantity of acid may be kept down to less than stoichiometric (say to about 0.8 equivalent or less) compared to the quantity of base employed, throughout the reaction period. The quantity of base itself may follow the customary practice in the art heretofore, which is generally from 0.05 to 5% by weight based on the weight of the acrolein. Our preferred practice is to use from 0.1 to 0.5% by weight of the base, with reference to the initial quantity of acrolein.

The nature of the base, likewise, may follow customary practice. Representative nitrogenous bases are piperidine, triethylamine, triethanolamine, pyridine and quinoline. Pyridine is generally preferred.

The proportions of the principal reactants, namely acrolein and methyl mercaptan, may be essentially stoichiometric in our invention. However slight excesses of either reactant (say up to 10% of theory) are permissible. The latter point is remarkable, inasmuch as the practices recorded in the prior art will not tolerate an excess of the acrolein.

The method selected for bringing the reactants together will depend largely on the cooling facilities available for controlling the exothermic reaction. The preferred method is to feed the acrolein into a mixture of the methyl mercaptan and basic catalyst. The acid may be introduced with the acrolein, or it may be added to the mercaptan-base mixture or in part to each.

It will be noted that with our improvement the strict regulation of the mode of feeding-in the acrolein, according to U. S. 2,676,190, is no longer important. In our invention, the acrolein may be fed in at any convenient rate. Finally, it is not absolutely necessary to have the acid in the reaction mass at the beginning of the reaction. Instead, it may be introduced after about 40% of the total quantity of the acrolein has been entered and consumed.

The temperature of the reaction may range from about 0° to 120° C., preferably from 40° to 80° C., while the system is maintained under sufficient pressure to keep the methyl mercaptan (the lower-boiling reactant) in the reaction mass in the liquid state.

The improvement of this invention is also applicable to continuous commercial production. In the continuous process all that is necessary is to mix the reactants, nitrogenous base, and acid thoroughly as they flow through a pipe. The acid, preferably acetic acid, may be introduced along with the acrolein, or it may be introduced with the methyl mercaptan-pyridine mixture. The base, preferably pyridine, should be in excess of acetic acid, when the reactants are mixed in continuous operation. The apparatus and the actual methods of effecting intimate mixing of the acrolein and methyl mercaptan streams may be as described in U. S. 2,676,190. The presence of acid in the reaction mass, subject to the limitations set forth above, suppresses secondary reactions and affords consistently high yield and high purity of beta-methylmercapto-propionaldehyde.

Without limiting our invention, the following examples are given to illustrate our preferred mode of operation. Parts mentioned are by weight.

In all examples, technical grades of acrolein and mercaptan were employed, and the former contained approximately 0.1% by weight of hydroquinone as antioxidant.

EXAMPLE 1

A stainless steel autoclave provided with an agitator and cooling jacket was charged with 440 parts of methyl mercaptan and 16 parts of pyridine. In another vessel, 5 parts of acetic acid were charged into 500 parts of acrolein, and stirred until thoroughly admixed. The acid-acrolein mixture was then added gradually to the base-mercaptan mixture, the rate of addition being adjusted so that the temperature of the reaction mass did not exceed 70° to 75° C. When a total of approximately 300 parts had been added, the temperature of the mass was lowered by external cooling to 40° C., and the remaining acid-acrolein mixture was fed in rapidly. The mass was then cooled to room temperature.

Aldehyde analysis of a sample, established by the standard oximation method and calculated back to MMPA (methylmercapto-propionaldehyde, m. w.=104), indicated a purity index of 92.3%. (The significance of this purity index is discussed in further detail hereinbelow.)

The reaction mass was found suitable directly for use in the preparation of alpha-hydroxy-gamma-methylmercapto-butyronitrile, which is the next step in the synthesis of methionine, and gave excellent results in such use.

A control run with the same materials and following the same procedure as in this example except that no acid whatever was added to the acrolein, produced a product having a purity index of but 59%.

EXAMPLE 2

The procedure of Example 1 was repeated, except that the quantity of acetic acid added to the acrolein was only 2.5 parts (0.5% by weight based on the acrolein. The CHO analysis gave a purity index of 91.9%.

EXAMPLE 3

The procedure of Example 1 was repeated, except that the quantity of acetic acid added to the acrolein was only 1.0 part (0.2% by weight based on the acrolein). The purity index of the product by CHO analysis was 93.0%.

EXAMPLE 4

The procedure of Example 1 was repeated except that the acid was added to the initial methylmercaptan-pyridine mixture instead of to the acrolein. The quantity of acid in each case was 1 part by weight. The results obtained were as follows:

| Acid added: | Purity index of product, percent |
|---|---|
| Formic | 93.5 |
| Acrylic | 94.0 |
| Sulfuric | 93.9 |
| Benzoic | 93.7 |

Control experiments run without the addition of any acid gave purity indexes ranging from 80.8 to 85.3%.

EXAMPLE 5

A stainless steel autoclave provided with an agitator and cooling jacket was charged with 440 parts of methyl mercaptan, 0.75 part of pyridine and 0.3 part of acetic acid. 500 parts of acrolein were then fed in rapidly with agitation, care being taken to keep the temperature of the reaction mass from exceeding 80° C. The reaction mass was then cooled to room temperature. High quality material, useful for the same purpose as indicated in Example 1, was obtained. Aldehyde analysis of a sample of this product gave a purity index of 97.5%. On the other hand a control run with the same materials, in the same equipment, following the above procedure except that no acid was added, yielded a product having a purity index of but 91.8%.

EXAMPLE 6

Employing the same equipment described in Example 5, a mixture of 500 parts of acrolein and 0.60 part of acetic acid was fed into a mixture of 440 parts methyl mercaptan and 0.75 part pyridine. The temperature of the reaction mass was controlled not to exceed 80° C. The mass was then cooled to room temperature. A sample of it analyzed for aldehyde, gave a purity index of 97.3%.

EXAMPLE 7

The procedure of Example 6 was repeated, except that the quantity of acetic acid added to the acrolein was 1.20 parts. The purity index of the product was 96.8%.

Essentially similar results were obtained when the same process was repeated using 2.40 parts of acetic acid (i. e. a 4:1 mole ratio with respect to the pyridine).

EXAMPLE 8

Following the procedure of Example 1, a mixture of 500 parts of acrolein and 0.15 part of acetic acid was added to a mixture of 440 parts of methyl mercaptan and 1.5 parts of pyridine, care being taken to keep the reaction temperature from exceeding 75° C. The purity index of the product obtained was 95.5%.

EXAMPLE 9

The same materials in the same quantities as in Example 8 were used, except that the acrolein-acetic acid mixture was added to the methyl mercaptan-pyridine mixture at a regulated rate whereby to maintain the temperature at 60° to 70° C. throughout the reaction period. The purity index of the product was 96.5%.

The aldehyde test

The CHO analyses given in the above examples and their significance merit further discussion. The data given represent the CHO content of the sample, determined by the well-known oximation text (using hydroxylamine hydrochloride as the reagent), and computed as MMPA (methylmercaptopropionaldehyde).

To make this point clearer, if 100 grams of a given sample are subjected to the oximation test, and if it be assumed that all its aldehyde content is in the form of MMPA, then the weight of the latter in the sample can be readily calculated from the quantity of HCl liberated in the oximation step. If analysis for mercaptan shows a residual content of say, 1.5 grams of methyl mercaptan in the sample, the same may be deducted from the initial 100 grams, leaving 98.5 grams of reaction mass exclusive of residual mercaptan. Dividing the calculated weight of MMPA from the oximation analysis by the weight of reaction mass exclusive of residual mercaptan, the quantity designated hereinabove as "purity index" is obtained. Taking into account the purity of the acrolein and the methyl mercaptan used in the above examples, a purity index of about 97.5% represents a 100% yield.

The purity index, nevertheless, is merely a convenient, conventional index for comparing the results of various techniques applied. It does not represent the true content of MMPA in the reactoin mass, because in practice part of the initial acrolein or of the resulting MMPA may have been consumed in secondary reactions, diminishing the yield of useful MMPA. For instance, if some of the MMPA were to be aldolized into a dimer, the latter would contribute only one CHO unit instead of two to the oximation test. Consequently, the purity index would drop to a value below 97.5%. Higher polymers, if formed, would depress the CHO content and purity index still further. The difference between the purity index actually determined and the theoretical index of 97.5% thus serves as a crude index to the quantity of dimer and other secondary reaction products present in the sample.

For instance, if all the MMPA produced were converted into said dimer, and if there were no other secondary reaction products, the purity index of the sample would be 50%, but the sample obviously would contain no MMPA.

It will be apparent from this discussion that the improvement in Example 1, for instance, over the control run is very much greater than would be off-hand inferred from a mere comparison of the figures 92.3% and 59%. It will be further clear why it is so important to have the yield consistently high in repeated production on a commercial scale.

Moreover, we find that whereas distillation of products prepared in the absence of acid is usually accompanied by considerable losses due to resinification in the still, distillation of the products prepared according to this invention, produces essentially no observable resinification. The product of this invention thus appears to have acquired a surprising degree of thermal stability at temperatures in the distillation range (usually about 50° to 200° C., depending on the pressure). This is obviously an added, valuable result of our invention.

It will be clear that the details of the above examples are merely illustrative, and may be varied widely without departing from the spirit of this invention. For instance, instead of adding free acid to a reaction mixture containing free nitrogenous base, e. g. pyridine, one may simply start with a mixture of base and a salt of the base, for instance pyridine and pyridine hydrochloride. Such a mixture may be added initially to the methyl mercaptan to be followed by feeding in of the acrolein; or it may be added to the acrolein and then fed in together therewith into the methyl mercaptan. Inert organic liquids, for instance dioxane, tetrahydrofurane or benzene, may be added to the reaction mass as diluents. Other variations in detail will be readily apparent to those skilled in the art.

We claim as our invention:

1. In the process of preparing beta-methylmercapto-propionaldehyde by reacting acrolein with methyl mercaptan in the presence of a nitrogenous base catalyst, the improvement which consists of effecting the reaction in the presence of an agent selected from the group consisting of acids whose dissociation constant in aqueous medium is at least $1 \times 10^{-6}$ and salts of such acids with said nitrogenous base, the mode of incorporation of said agent in the reaction mass being controlled to the effect that there be an excess of free nitrogenous base in the reaction mass at least until after 10% of the reactants have been consumed and that there be present at least 0.05 equivalents of said agent per equivalent of said nitrogenous base after 40% of the reactants have been consumed.

2. In the process of preparing beta-methylmercapto-propionaldehyde by reacting acrolein with methyl mercaptan in the presence of pyridine as catalyst, the improvement which consists of adding to the reaction mass a carboxylic acid whose dissociation constant in aqueous medium is at least $1 \times 10^{-6}$, the total quantity of acid added during the reaction period being between 0.05 and 10 equivalents per mole of pyridine employed in the reaction mass, but the manner of adding the acid being controlled to the effect that the reaction mass shall contain an excess of the base at least until about 10% of the reactants have been consumed.

3. A process of producing beta-methylmercapto-propionaldehyde, which comprises feeding a mixture of acrolein and an acid whose dissociation constant in aqueous medium is at least $1 \times 10^{-6}$ into a mixture of methyl mercaptan and a nitrogenous base catalyst, the rate of feeding of the former mixture into the latter being such that there is maintained an excess of the free base at least until 10% of the acrolein has been consumed.

4. A process as in claim 3, the acid being a carboxylic acid.

5. A process as in claim 3, the nitrogenous base being pyridine.

6. A process as in claim 3, the nitrogenous base being pyridine, the acid being acetic acid, and the quantity thereof being between 0.05 and 4.0 moles per mole of pyridine.

7. A process of producing beta-methylmercapto-propionaldehyde, which comprises feeding acrolein into a mixture of methyl mercaptan, a nitrogenous base catalyst, and an acid, said acid having a dissociation constant in aqueous medium not less than $1 \times 10^{-6}$ and being present in less than stoichiometric quantity compared to the quantity of said base.

8. A process of producing beta-methylmercapto-propionaldehyde, which comprises feeding acrolein into a mixture of methyl mercaptan, pyridine and acetic acid, the quantity of the latter being between 0.05 and 0.80 mole per mole of said pyridine.

No references cited.